United States Patent [19]
Chambers

[11] Patent Number: 5,734,374
[45] Date of Patent: Mar. 31, 1998

[54] TRACKBALL CONTAMINATION BARRIERS

[76] Inventor: John Daniel Chambers, 1459 Capri. Ave., Petaluma, Calif. 94954

[21] Appl. No.: 447,197

[22] Filed: May 22, 1995

[51] Int. Cl.⁶ ........................................ G09G 5/08
[52] U.S. Cl. ........................................ 345/167; 345/163
[58] Field of Search ........................ 345/167, 163, 345/156, 157, 164, 168; 74/471 XY

[56] References Cited

U.S. PATENT DOCUMENTS

| | | | |
|---|---|---|---|
| 4,760,618 | 8/1988 | Chapin, Jr. | 15/104 |
| 4,866,277 | 9/1989 | Johnson et al. | 250/385.1 |
| 5,078,019 | 1/1992 | Aoki | 74/471 |
| 5,162,780 | 11/1992 | Solhiell | 340/710 |
| 5,208,736 | 5/1993 | Crooks et al. | 361/393 |
| 5,253,836 | 10/1993 | Tso | 248/225 |
| 5,283,555 | 2/1994 | Ward et al. | 345/156 |
| 5,350,146 | 9/1994 | Chiang | 248/231 |
| 5,358,766 | 10/1994 | Field | 428/77 |
| 5,385,417 | 1/1995 | Wade et al. | 400/472 |
| 5,394,169 | 2/1995 | Tseng | 345/167 |
| 5,397,189 | 3/1995 | Minogue | 400/489 |
| 5,409,107 | 4/1995 | Browne | 206/305 |
| 5,448,023 | 9/1995 | Tool | 178/18 |
| 5,486,845 | 1/1996 | Chait | 345/163 |

OTHER PUBLICATIONS

Thomas, Office Essentials; Home Office Computing, vol. 8, No. 11 Nov. 1990, p. 78.

*Primary Examiner*—Andrew Faile
*Assistant Examiner*—Andrew B. Christensen
*Attorney, Agent, or Firm*—Gifford,Krass,Groh, Sprinkle,Patmore, Anderson&Citkowski

[57] ABSTRACT

A device helps prevent contamination from reaching the inner workings of a computer trackball assembly, thereby prolonging intervals between maintenance. A circular ring attaches to the exposed surface of the panel through which the trackball protrudes for use, preferably to the retaining ring typically used to hold the ball in place. In cooperation with this ring, means are provided for preventing contamination from migrating below the panel surrounding the ball, thereby helping to keep clean the inner workings of the trackball assembly. In one embodiment, the means cooperating with the circular ring includes a second ring of material having an aperture with a diameter dimensionally configured to wipe against the outer surface of the trackball during use. In an alternative embodiment, the means cooperating with the circular ring includes a flexible dome of material entirely covering the externally exposed surface of the trackball.

7 Claims, 4 Drawing Sheets

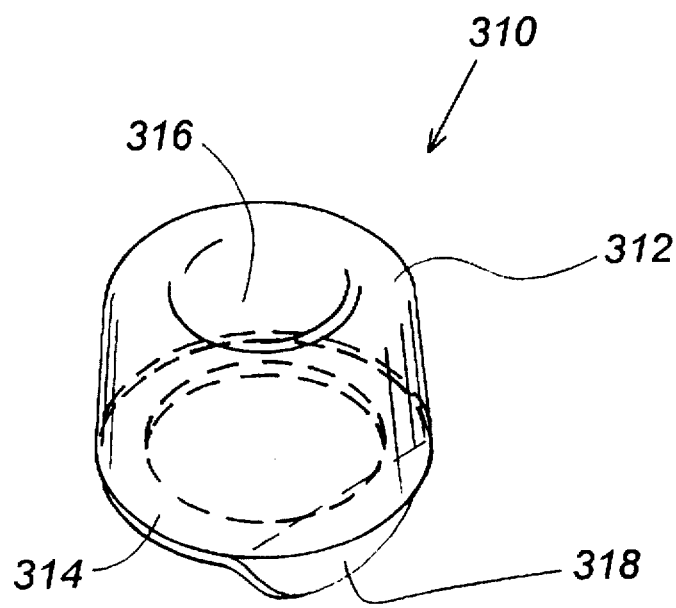
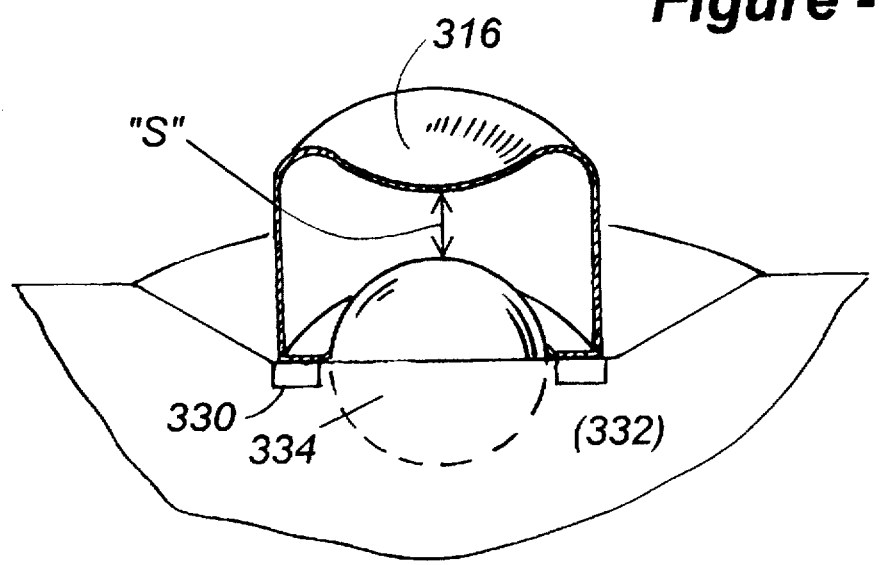
*Figure - 3*

TRACKBALL CONTAMINATION BARRIERS

FIELD OF THE INVENTION

The present invention relates generally to computer user-interface accessories and, in particular, to apparatus associated with providing a barrier against dirt, lint and other contaminants from migrating into the trackball assembly of a computer equipped with such a pointing device.

BACKGROUND OF THE INVENTION

Computer user-interface devices have improved dramatically in recent years, from individual keys associated with cursor movement, to the mouse, to the trackball now common on laptop machines. Though ergonomic, trackball assemblies are often subject to migration of contaminants, which reach the inter-workings of the trackball assembly, resulting in maintenance problems. Symptomatically, once sufficient dirt or lint reaches the rollers associated with translating movements of the trackball into electrical signals associated with pointing, the cursor simply does not move at all, or moves in an erratic, uncontrolled manner. Typically, in response, the user must uncouple the retaining ring used to hold the trackball in place, then, using a toothpick, cotton swab or the like, the user must meticulously clean the rollers and other surfaces to reinstate proper operation. Given the frustrating need for such routine maintenance, any device capable of prolonging such maintenance intervals would be greatly appreciated by the computer user community.

SUMMARY OF THE INVENTION

The present invention provides a device for preventing contamination from reaching the inner workings of a computer trackball assembly, thereby prolonging intervals between maintenance. The device attaches to the exposed surface of the panel through which the trackball protrudes, providing means for preventing contaminants from migrating below the panel. In one embodiment, the device includes a layer of material having a circular aperture with a diameter dimensionally configured to contact the outer surface of the trackball during use, thereby providing an effective barrier against particulate entry. In an alternative embodiment, the device includes a flexible dome of material entirely covering the externally exposed surface of the trackball. In either case the device is preferably attached to the retaining ring which typically forms a portion of the panel through which the trackball protrudes for use.

Thus, in one embodiment, the device includes a layer of non-rigid material having a lower surface, an upper surface and a circular aperture formed therethrough, the lower surface being held in place with respect to the exposed surface of the panel through which the trackball protrudes, the diameter of the aperture being slightly dimensionally smaller than the girth of the trackball, causing the outer surface of the trackball to contact with the inner diameter of the aperture as the ball is rotated. Various materials may be use for this purpose, including absorbent materials to which a solvent or cleaning solution may be introduced. Preferably, however, in this embodiment a flexible, resilient material is employed, for example, an open-cell foam. In addition, upper and lower members, each with circular apertures, are also preferably used to sandwich the material, thus forming a unitary structure which may be conveniently removably adhered to the retaining ring or other surface of the panel surrounding the area through which the trackball protrudes.

In a second embodiment, the device forms a barrier against contaminants migrating beneath the panel surrounding the exposed surface of the trackball by providing a dome of flexible material having a lower flange adapted for adhesion against the panel, or retaining ring the dome including an upper portion attached to the lower flange which totally encloses the exposed of the trackball, thereby protecting the trackball mechanisms disposed beneath the panel surface. Preferably in this embodiment, the inner sidewall of the dome is substantially cylindrical where it attaches to the flange, and the flange extends radially inwardly from the cylindrical sidewall of the dome. The upper portion of the dome preferably further includes a concave dimple configured to receive a portion of a user's finger, typically the thumb. Although various materials may be used to form the dome and flange, molded latex rubber is the preferred choice for this purpose.

BRIEF DESCRIPTION OF THE DRAWINGS

FIG. 3 is an oblique drawing of an alternative embodiment of the invention which entirely covers the otherwise exposed outer surface of a trackball;

DETAILED DESCRIPTION OF THE PREFERRED EMBODIMENT

Figure 1:
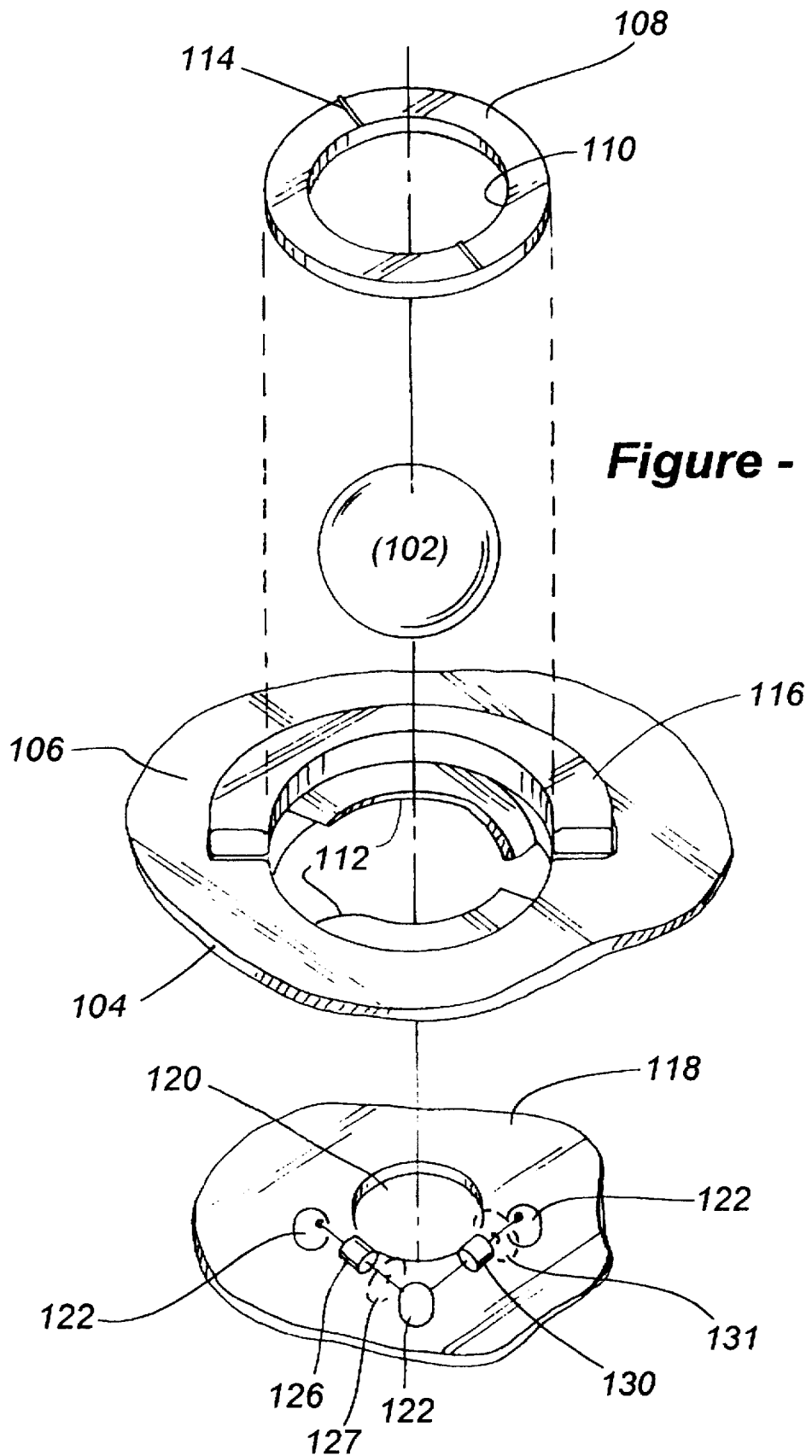
FIG. 1 is an exploded view of a typical trackball assembly.

Now making reference to the drawings, FIG. 1 provides an exploded view of a typical trackball assembly. It should be kept in mind that the invention may be used with any trackball assembly, and not necessarily the one depicted in FIG. 1, which is used simply to illustrate major components for reference purposes. The ball itself 102, fits into an aperture formed in a panel 104 having an upper surface 106. The ball 102 is held in place with a retaining ring 108 having an upper surface which tends to be flush with that of 106, the ring having an inner diameter 110 sufficient to retain the ball 102 when twisted into a locking mechanism comprising bent tabs 112 which are obscured when the retaining ring 108 is in place. On some models, one or more raised portions 114 may be provided to assist the user in twisting the ring 108 onto and off of the bent tabs 112. Around the retained trackball one typically finds one or more raised bars or switches such as curved bar 116 which is used for selection purposes by the user once the cursor has been moved to a desired location on the screen by turning the ball 102. Many trackball assemblies may also include ball bearings or other support structures to minimize "chatter" as the ball is rotated during use.

Beneath the panel 104 there is typically found a plastic piece 118 which may or may not function as a printed circuit board, and which may or may not include an aperture 120 to receive the lower portion of ball 102 so as to provide a thinner overall profile. On the surface of piece 118, typically suspended between supports 122, are two rollers 126 and 130 which make independent contact with the lower, exposed surface of the ball 102. Movement of the rollers 126 and 130 typically causes coupled movement of encoding wheels 127 and 131 which are optically read to determine position. With the axes of the rollers perpendicular with respect to one another, any motion of the ball 102 may be translated into a two-dimensional movement of a cursor or other visual indicia on the screen of the computer associated with the trackball assembly. In other words, one of the rollers is associated with movement in the X direction, whereas the other is associated with movement in the Y direction. Although the above description pertains to one particular twin-roller configuration, it should be understood that the present invention is applicable to any trackball system wherein the ball has an upper surface engageable by a user and a lower surface, typically beneath a panel, which might benefit from a device which guards against contaminants from migrating below the panel and into the inner workings of the system.

Figure 2:
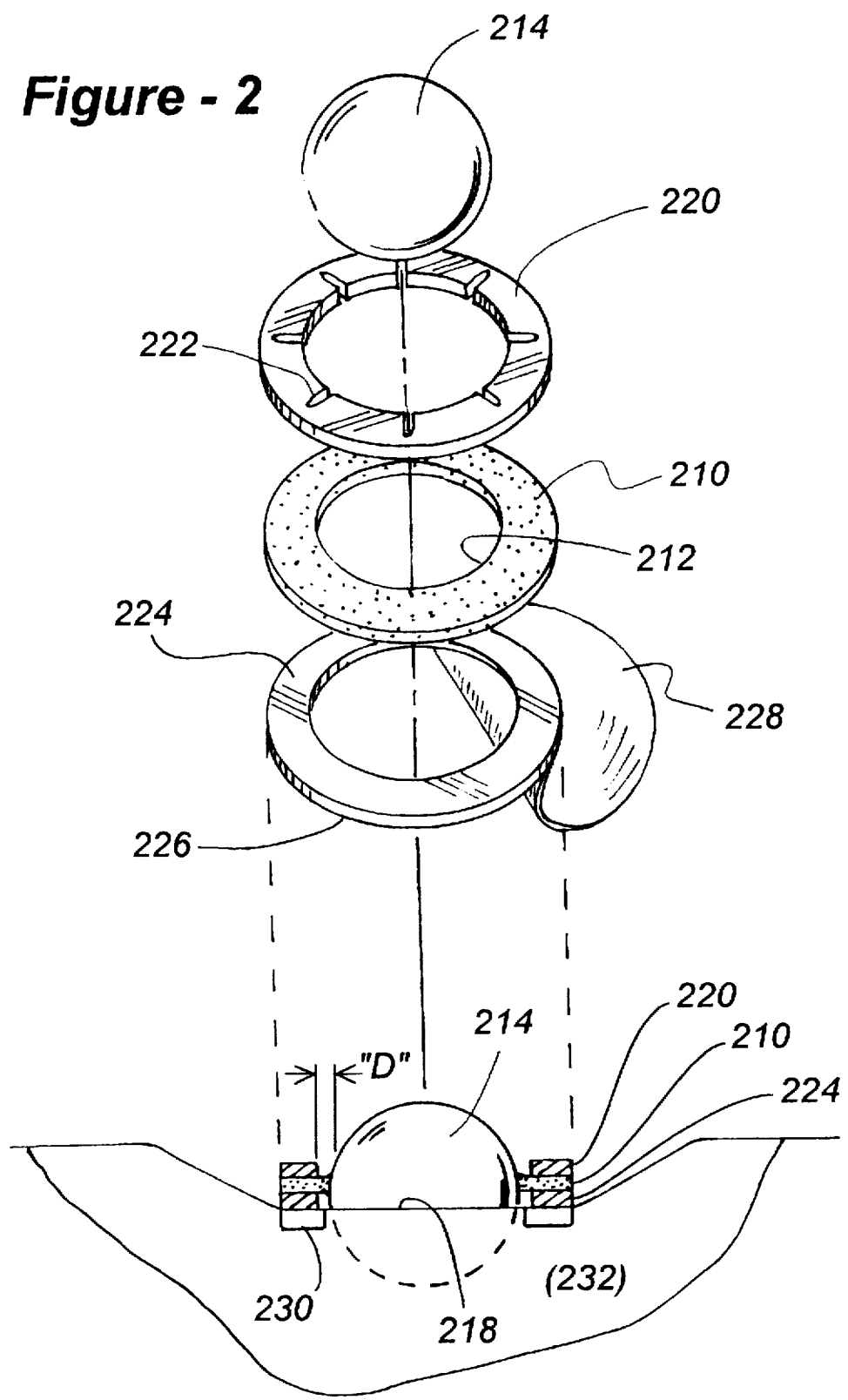
FIG. 2 illustrates an exploded view of one embodiment of this invention, and also shows the device as a unitary structure in place with respect to an installed trackball.

FIG. 2 reveals one embodiment according to the invention, with the upper portion in exploded form, and with the lower portion of the drawing showing the various components installed and ready for use. Central to this embodiment is the use of a layer of non-rigid material 210 having a circular aperture 212 with a diameter no less than the girth of the ball 214 in the area where the ball protrudes through the material 210 when installed. Preferably, this material 210 is shaped as a relatively thin circular ring, though other shapes are possible so long as at least a portion of the inner wall of the aperture 212 contacts the outer surface of the ball during use.

In a broad aspect of the invention, only the material 210 is required, in which case it may be adhered directly to the surface 218 of which the ball 214 protrudes. However, to provide physical stability and to protect the material 210 from becoming prematurely soiled or dried, upper member 220 may be added, and may include radially outwardly directed slots 222 to help facilitate with the contacting of material 210 against the outer surface of the ball 214 by providing additional flexibility of the material 210. As a further option, lower member 224 may additionally be added, thereby sandwiching the material 210 between the upper and lower members 220 and 224, providing a unitary assembly protecting the material 210 which may be removably secured to the surface 218 in a more straightforward manner. For example, the bottom surface 226 of the member 224 may include an adhesive exposed by the removal of a release layer 228.

Preferably, the members 220 and 224 are also in the form of circular rings, having internal circular apertures with diameters slightly larger than that of the ring 210, enabling the extent of the material indicated by distance "D" in the lower portion of the figure to move somewhat and provide improved contact as the ball 214 rotates. The rings 220 and 224 are preferably composed of a relatively rigid plastic material, whereas the material 210 is preferably flexible and resilient, and may be of an absorbent or non-absorbent nature. For example, absorbent compressed cotton felt may be used for this purpose, though, preferably, open-cell foam is used instead as it is less likely to introduce its own particulates as the ball 214 rotates. Preferably, for aesthetic reasons and in some cases due to physical constraints, the outer diameters of rings 220, 210 and 224 are all coincident, enabling the entire device to be adhered to the upper surface of the retaining ring 230 supported within the computer 232.

Although the material 210 and sandwiching rings 220 and 226 are all shown installed above the panel 218 in FIG. 2, it should be understood that for some models of computers, sufficient space may be available directly below the retaining ring when installed, thereby facilitating disposition of the material 210 and any other optional structural components beneath the retaining ring, thereby providing a version of the invention not visible after being installed. Indeed, in yet a further alternative embodiment of the invention, the material 210 may be fastened in one way or another to the retaining ring, either above or below the ring, resulting in a product according to the invention in the form of a replacement retaining ring having a built in contamination barrier according to this invention.

Now referring to FIG. 3, there is shown an embodiment of the invention generally at 310 in the form of a dome 312 of material having a lower flange 314 and an upper surface preferably including a dimple 316, the significance of which will become apparent shortly. This dome may be composed of any flexible material, though in the preferred version of this embodiment, is constructed of a thin molded latex rubber. The lower illustration of FIG. 3 shows this version of the invention installed and ready for use. As with the embodiment of FIG. 2, the flange 314 is preferably shaped as a relatively thin circular ring enabling it to engage directly onto the retaining ring 330 of computer 332 having removed optional release layer 318. In contrast to the embodiment of FIG. 2, however, which contacts the girth of the ball 214 during use, in this version of the invention the dome, when properly mounted, entirely covers the outer exposed surface of the ball 334 during use so as to provide an effective barrier from any dust, dirt, finger oil or other contaminants from finding their way to the lower portions and inner workings of the trackball assembly. Various physical dimensions may be adjusted in accordance with this embodiment, including the spacing S between the bottom of the dimple 316 and the top of the ball 334, so long as a user can properly operate the trackball for its intended purpose through the dome 312.

Figure 4A:
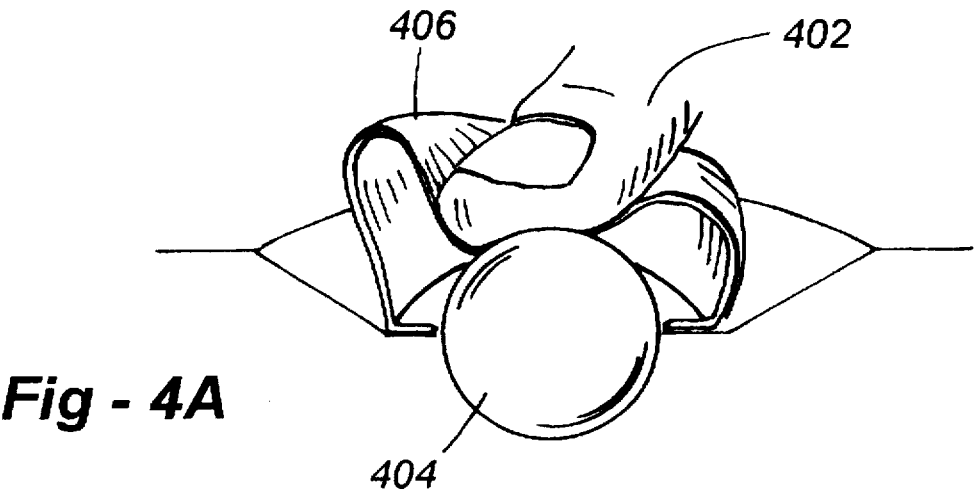
FIG. 4A is a side-view drawing showing a first position of a user's thumb prior to movement of a trackball taking advantage of the alternative embodiment of the invention of FIG. 3.
Figure 4B:
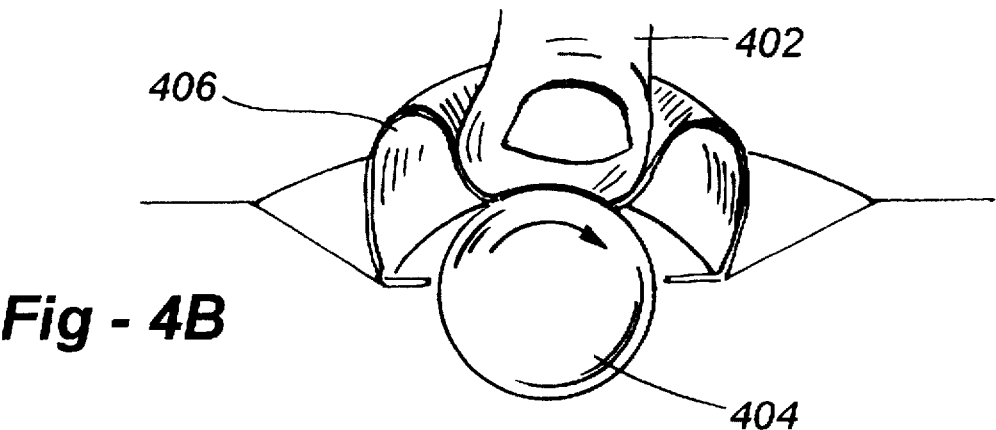
FIG. 4B illustrates the trackball of FIG. 4A during rotational movement.
Figure 4C:
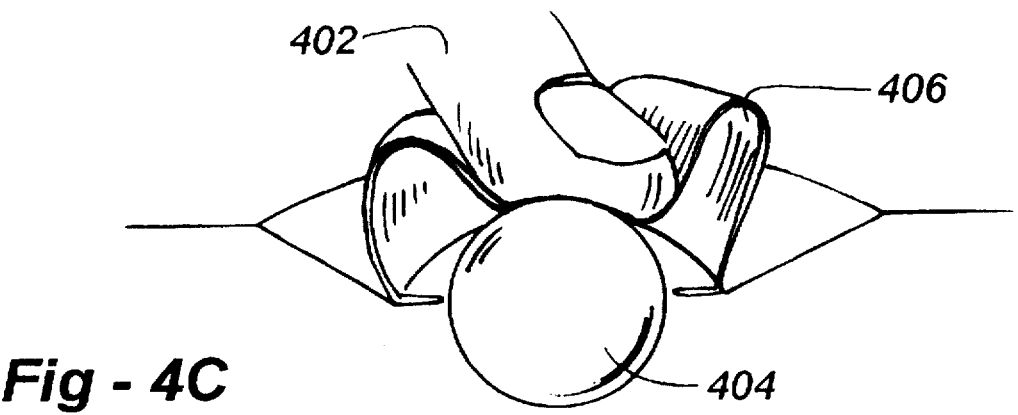
FIG. 4C illustrates the relative position of the user's finger, inventive structure and trackball following the movement of FIG. 4B.

The function of the dimple 316 is to provide an area to receive a finger of the user, typically the thumb. This use is better understood with reference to FIG. 4, which shows the position of a user's thumb 402 before (FIG. 4A), during (FIG. 4B) and after (FIG. 4C) rotation of a trackball 404. As shown in FIG. 4A, with the thumb initially off to the left in the figure, the dome of flexible material 406 will typically deform as shown, with a loop of material being asymmetric and perhaps taller leftwardly with respect to the figure. During movement (FIG. 4B), the dome will be depressed in the vicinity of the dimple, but somewhat more symmetric whereas, as shown in FIG. 4C, upon completion of the movement the dome will be deformed asymmetrically, taking on a shape more or less the mirror image to that of FIG. 4A.

Having thus described my invention, I claim:

1. A device for preventing contamination from reaching the inner workings of a computer trackball assembly of the type wherein a trackball, having an outer surface, protrudes through a surrounding panel having an upwardly oriented exposed surface, comprising:

a substantially thin circular supporting ring having a top surface, a bottom surface, and a central aperture with an inner diameter, the bottom surface including an adhesive layer and a release layer applied thereto which is removed to expose the adhesive layer, enabling the ring to be adhered to the upwardly oriented exposed surface of the surrounding panel, the inner diameter being sized so that when the supporting ring is properly centered and adhered to the surrounding panel, it does not touch the outer surface of the trackball as the trackball rotates during use; and a substantially thin circular trackball wiping ring having a central aperture with an inner diameter, the ring being permanently bonded to the top surface of the supporting ring, such that its aperture is concentric to that of the supporting ring, the inner diameter of the wiping ring being less that of the supporting ring, and sized so that the outer surface of the trackball makes wiping engagement therewith as the trackball is rotated during use, thereby preventing contamination from migrating below the surrounding panel.

2. The device of claim 1, wherein the wiping ring of material is absorbent in nature.

3. The device of claim 2, the wiping ring being composed of open-cell foam.

4. The device of claim 1, wherein the supporting ring and wiping ring have outer diameters which are the same and in alignment with one another.

5. The device of claim 1, further including a outer circular ring permanently bonded to the trackball wiping ring such that the wiping ring is sandwiched between the outer ring and the supporting ring, the outer ring having a central aperture with an inner diameter concentric to that of the wiping ring and supporting ring, but greater than that of the inner diameter of the wiping ring, so that the outer ring does not touch the outer surface of the trackball as the trackball rotates during use.

6. The device of claim 5, wherein the outer ring includes one or more radially inwardly extending partial cuts.

7. The device of claim 5, wherein the supporting ring and wiping ring have outer diameters which are the same and in alignment with one another.

* * * * *